US009801332B2

(12) United States Patent
Landphair et al.

(10) Patent No.: US 9,801,332 B2
(45) Date of Patent: Oct. 31, 2017

(54) SYSTEM AND METHOD FOR CONSISTENT DEPTH SEEDING TO MOISTURE

(71) Applicant: Deere & Company, Moline, IL (US)

(72) Inventors: Donald K. Landphair, Moline, IL (US); Lawrence D. Green, Bettendorf, IA (US)

(73) Assignee: Deere & Company, Moline, IL (US)

( * ) Notice: Subject to any disclaimer, the term of this patent is extended or adjusted under 35 U.S.C. 154(b) by 43 days.

(21) Appl. No.: 14/871,458

(22) Filed: Sep. 30, 2015

(65) Prior Publication Data
US 2017/0086359 A1 Mar. 30, 2017

(51) Int. Cl.
*A01C 7/20* (2006.01)
*A01C 5/06* (2006.01)
*A01C 21/00* (2006.01)

(52) U.S. Cl.
CPC .............. *A01C 7/203* (2013.01); *A01C 21/00* (2013.01); *A01C 5/06* (2013.01)

(58) Field of Classification Search
CPC ........... A01C 5/06; A01C 5/062; A01C 7/201; A01C 7/203; A01C 7/205; A01C 21/00
USPC ...................................... 111/69, 149; 701/50
See application file for complete search history.

(56) References Cited

U.S. PATENT DOCUMENTS

| 5,524,560 A | 6/1996 | Carter |
| 7,630,806 B2 | 12/2009 | Breed |
| 8,522,889 B2 * | 9/2013 | Adams ................... A01C 7/203 111/136 |
| 8,924,092 B2 * | 12/2014 | Achen ..................... A01B 49/04 111/200 |
| 9,232,687 B2 * | 1/2016 | Bassett ................ A01B 61/044 |
| 2009/0164067 A1 | 6/2009 | Whitehead et al. |

(Continued)

FOREIGN PATENT DOCUMENTS

| WO | 2013066652 | 5/2013 |
| WO | 2014153157 | 9/2014 |

(Continued)

OTHER PUBLICATIONS

Hanna, et. al., Applied Engineering in Agriculture, vol. 26(4): pp. 551-556, (2010) American Society of Agricultural and Biological Engineers ISSN 0883-8542.

(Continued)

*Primary Examiner* — John G Weiss
(74) *Attorney, Agent, or Firm* — Michael Best & Friedrich LLP

(57) ABSTRACT

A seeding machine includes a main frame and a row unit coupled to the main frame. The row unit includes a row unit frame, a gauge wheel coupled to the row unit frame, a furrow opener coupled to the row unit frame, the furrow opener having a stationary or rotating surface that contacts and moves soil, and a furrow closer coupled to the row unit frame, the furrow closer having a stationary or rotating surface that contacts and presses soil. The seeding machine also includes a seeding adjustment system including a soil removal device, a moisture sensor, a controller configured to receive a signal from the moisture sensor corresponding to the detected moisture level, and an actuator configured to change a position of the soil removal device based on the signal received by the controller.

19 Claims, 3 Drawing Sheets

(56) References Cited

U.S. PATENT DOCUMENTS

| | | |
|---|---|---|
| 2011/0126746 A1 | 6/2011 | Borland |
| 2012/0083907 A1 | 4/2012 | Motavalli et al. |
| 2014/0303854 A1* | 10/2014 | Zielke .................... A01C 21/00 |
| | | 701/50 |
| 2014/0379228 A1 | 12/2014 | Batcheller et al. |
| 2015/0066932 A1 | 3/2015 | Stuber et al. |
| 2015/0105965 A1 | 4/2015 | Blackwell et al. |
| 2015/0264857 A1* | 9/2015 | Achen .................... A01B 49/06 |
| | | 111/149 |
| 2015/0289441 A1* | 10/2015 | Arnett .................... A01C 7/046 |
| | | 111/185 |
| 2015/0296698 A1* | 10/2015 | Schumacher .......... A01C 7/203 |
| | | 172/4 |
| 2016/0037709 A1 | 2/2016 | Sauder et al. |
| 2016/0116632 A1* | 4/2016 | Stoller ................. A01B 79/005 |
| | | 356/72 |
| 2016/0338260 A1* | 11/2016 | Hahn .................... A01C 5/062 |

FOREIGN PATENT DOCUMENTS

| | | |
|---|---|---|
| WO | 2015143433 A2 | 9/2015 |
| WO | WO2015171908 A1 * | 11/2015 |

OTHER PUBLICATIONS

Extended European Search Report from the European Patent Office for Application No. EP16190940.3 dated Feb. 7, 2017 (9 pages).

* cited by examiner

SYSTEM AND METHOD FOR CONSISTENT DEPTH SEEDING TO MOISTURE

BACKGROUND

The present disclosure relates to systems and methods for planting seeds, in particular with a row crop planter.

It is generally desirable to plant all seeds of a particular type at a specific seed planting depth so that emergence is equal for all such seeds. Growth of such seeds also depends on soil moisture levels at the specific seed planting depth, however, and seeds exposed to varying moisture levels at a given depth will germinate unevenly, with some plants not producing crop yet draining valuable nutrients from those that do.

SUMMARY

In one aspect, the disclosure provides a seeding machine that includes a main frame and a row unit coupled to the main frame. The row unit includes a row unit frame, a gauge wheel coupled to the row unit frame, a furrow opener coupled to the row unit frame, the furrow opener having a stationary or rotating surface that contacts and moves soil, and a furrow closer coupled to the row unit frame, the furrow closer having a stationary or rotating surface that contacts and presses soil. The seeding machine also includes a seeding adjustment system including a soil removal device, the soil removal device having a stationary or rotating surface that contacts and moves soil, a moisture sensor configured to detect a moisture level at one or more layers of soil, a controller configured to receive a signal from the moisture sensor corresponding to the detected moisture level, and an actuator configured to change a position of the soil removal device based on the signal received by the controller.

In another aspect, the disclosure provides a seeding machine that includes a controller having a processor configured to detect a moisture level of a first layer of soil with a moisture sensor coupled to a row unit on the seeding machine, determine whether the moisture level is outside of a predetermined range, and in response to determining that the moisture level is outside of the predetermined range, lower a soil removal device into the soil to remove a layer of the soil, the soil removal device including a stationary or rotating surface that contacts and removes the first layer of soil.

In another aspect, the disclosure provides a seeding machine that includes a main frame, a row unit coupled to the main frame, and a seeding adjustment system coupled to the row unit. The seeding adjustment system includes a soil removal device, the soil removal device selected from a group consisting of a V-wing, a row cleaner, and a disk blade. The soil removal device has a stationary or rotating surface that contacts and moves soil. The seeding adjustment system also includes a moisture sensor coupled to the row unit and configured to detect a moisture level at one or more layers of soil, a controller configured to receive a signal from the moisture sensor corresponding to the detected moisture level, and an actuator configured to change a position of the soil removal device based on the signal received by the controller. The actuator is selected from a group consisting of a hydraulic actuator, a pneumatic actuator, and an electronic actuator.

Other aspects of the disclosure will become apparent by consideration of the detailed description and accompanying drawings.

DETAILED DESCRIPTION

Before embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

Figure 1:
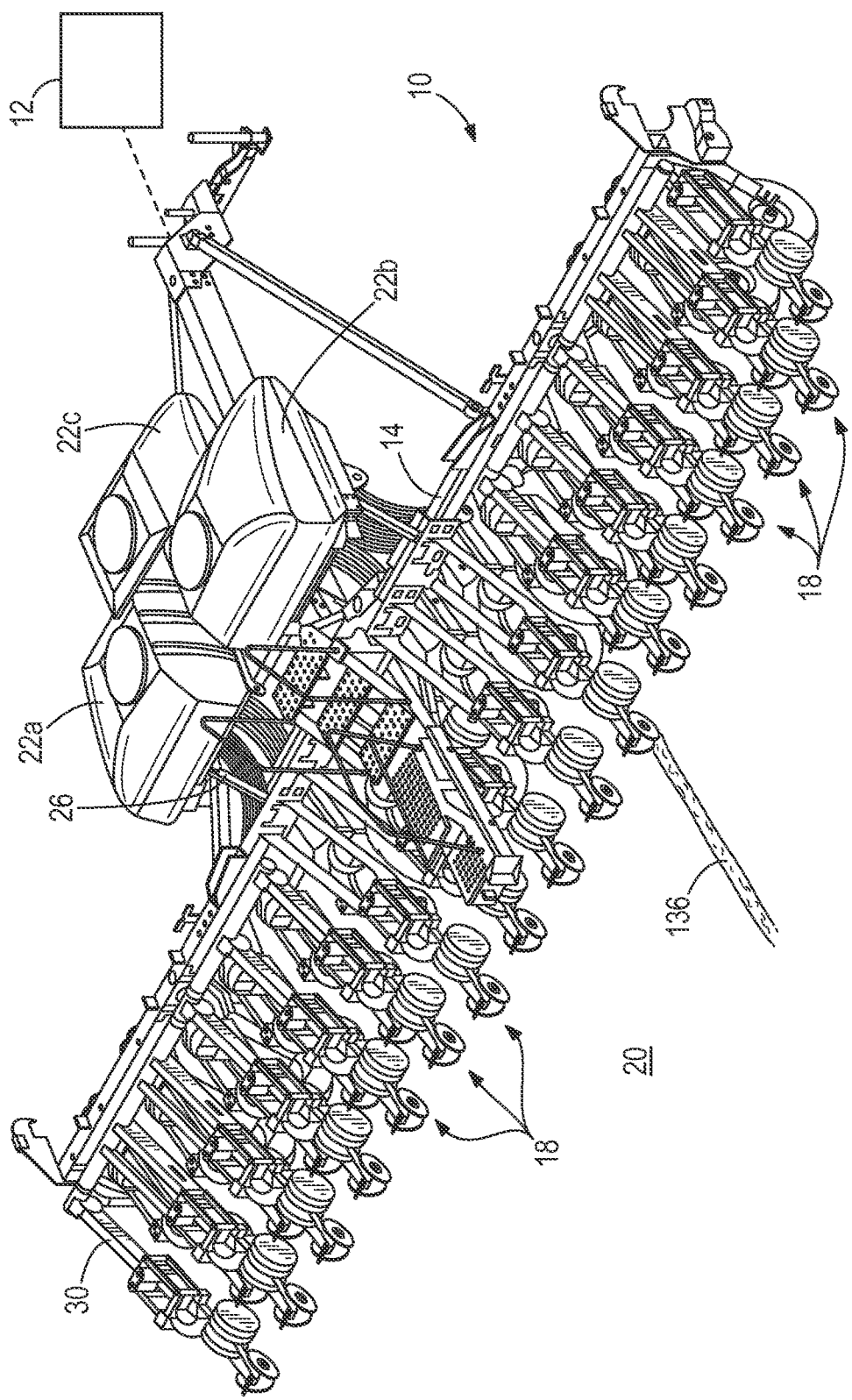
FIG. 1 is a partially schematic perspective view of a seeding machine.

FIG. 1 illustrates a seeding machine 10 (e.g., a row crop planter). The seeding machine 10 is towed by a tractor (not shown) having an operator's cab 12 (shown schematically). Machine 10 has a main frame 14. A plurality of individual row units 18 are coupled (e.g., mounted) on a rear portion of the main frame 14, such that the row units 18 are pulled over a layer of soil 20. Seed sources, such as storage tanks 22a-22c, are coupled to the main frame 14, and hold seed that is delivered, e.g., pneumatically or in any other suitable manner, to a mini-hopper (not shown) on each row unit 18. The storage tanks 22a-22c are coupled to the mini-hoppers by way of conduits 26, such as hoses, and a pressurized delivery apparatus (not shown). Each storage tank 22a-22c contains the same or different varieties of seed to be planted in the soil 20. Thus, each row unit 18 can be coupled to one of the conduits 26 such that each row unit 18 is coupled to a storage tank 22a-22c to receive seed. As illustrated in FIG. 1, each row unit 18 further includes its own frame 30, to which various components (e.g., a furrow opener, a furrow closer, etc.) are mounted.

Figure 2:
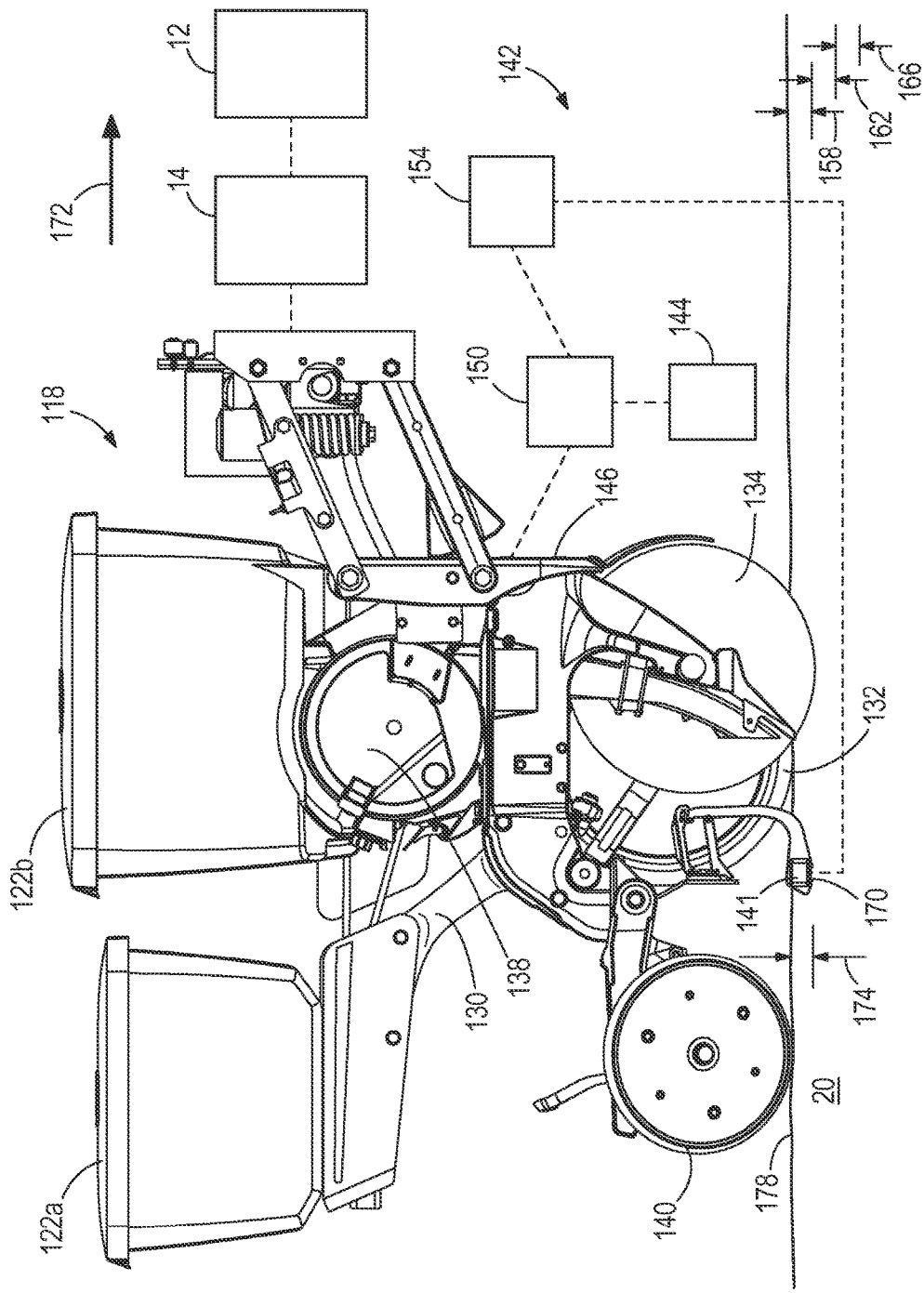
FIG. 2 is a partially schematic side view of a row unit for the seeding machine of FIG. 1, illustrating a soil removal device in a first position.
Figure 3:
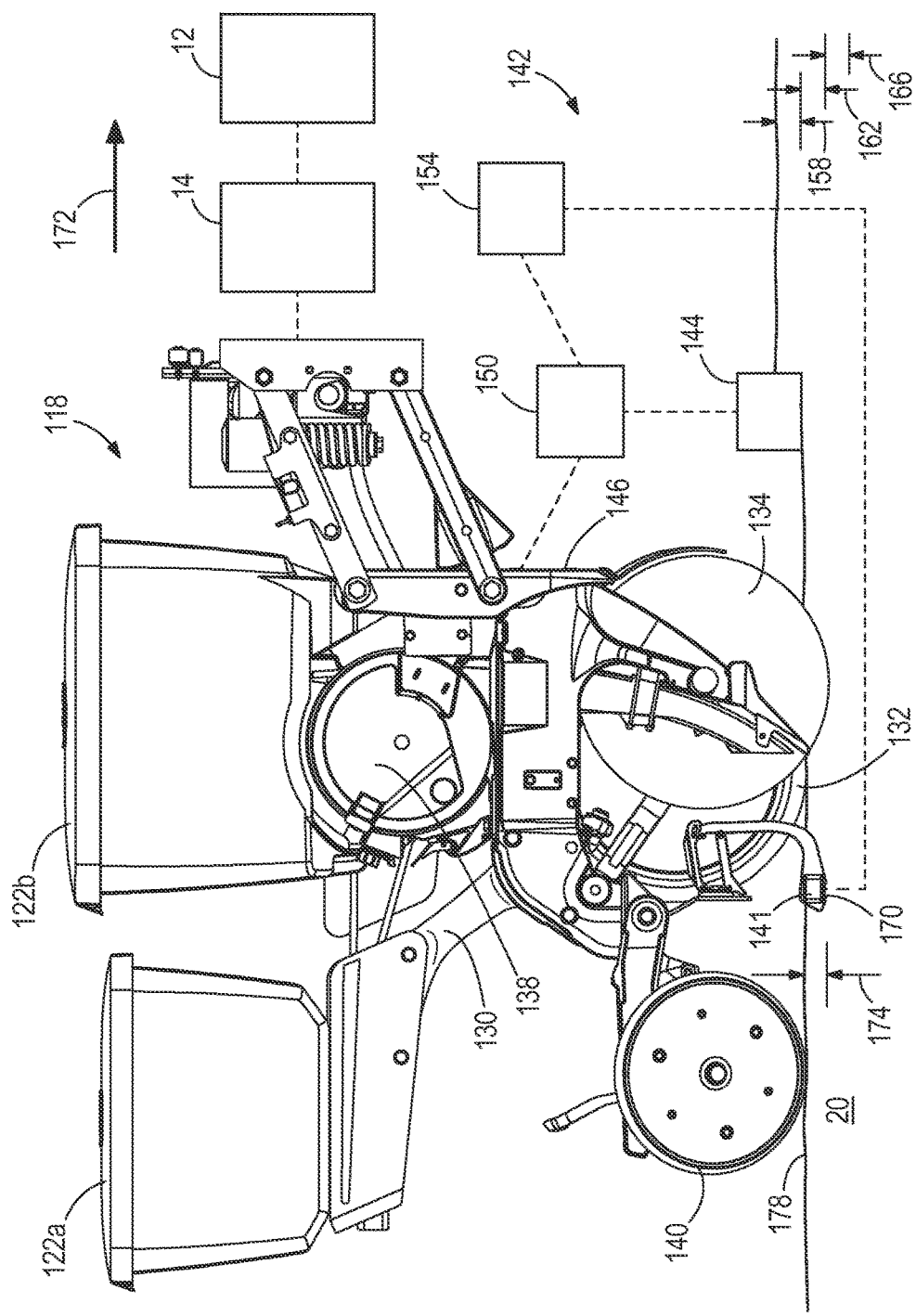
FIG. 3 is a partially schematic side view of a row unit for the seeding machine of FIG. 1, illustrating a soil removal device in a second position.

FIGS. 2 and 3 illustrate an example of a row unit 118 that may be used in place of one of the row units 18 in FIG. 1. Similar to the row unit 18, the row 118 is also coupled to the main frame 14. In some constructions, a plurality of row units 118 are coupled to the main frame 14, similar to the row units 18 in FIG. 1.

As illustrated in FIGS. 2 and 3, each row unit 118 includes its own seed hopper 122b and a chemical hopper 122a. The hoppers 122a, 122b are coupled to a row unit frame 130. Each row unit 118 also includes a gauge wheel (or wheels) 132 coupled to the row unit frame 130 that contacts and rolls along the soil 20, and a furrow opener 134 (e.g., an opening disk or pair of disks or other structure having a stationary or rotating surface that contacts and moves soil away to form a furrow) coupled to the row unit frame 130 for forming a furrow 136 (see FIG. 1) in the soil 20. A seed metering device 138 coupled to the row unit frame 130 receives seed from the hopper 122b and meters and dispenses the seeds into the furrow 136. A furrow closer 140 (e.g., a closing and packing wheel or wheels or other structure having a stationary or rotating surface that contacts and presses soil) coupled to the row unit frame 130 pushes soil back into the furrow 136. In the illustrated construction, each row unit 118 also includes a seed firmer device 141 coupled to the row unit frame 130 that firms each seed and pushes it into the furrow 136 before the furrow is closed.

With reference to FIGS. 2 and 3, each row unit 118 further includes a seeding adjustment system 142. The seeding adjustment system 142 monitors soil moisture in the soil 20 and maintains a consistent seed planting depth for each seed, while simultaneously ensuring that each seed is also planted in soil with a desired soil moisture level.

The seeding adjustment system 142 includes a soil removal device 144. In the illustrated construction, the soil removal device 144 is coupled to a front, leading end 146 of the row unit frame 130 and is disposed in front of the furrow opener 134. In some constructions, the soil removal device 144 is a V-wing, row cleaner, disk blade, disk furrower, or any other structure that includes a stationary or rotating surface that contacts and removes one or more layers of soil (e.g., John Deere Part #BA25853 (V-wing sweep), John Deere Part #BA26105 (Conservation disk furrow), or John Deere Part #BA32571 (Unit-mounted row cleaner)).

The seeding adjustment system 142 further includes an actuator 150 coupled to (e.g., attached to) the row unit frame 130 and that moves the soil removal device 144. The actuator 150 is further coupled to (e.g., in communication with) a controller 154 mounted to the row unit frame 130 or located remotely from the row unit frame 130 (e.g., on the main frame 14 or the operator's cab 12). The controller 154 includes a processor, and can be hard-wired to the actuator 150 or in wireless communication with the actuator 150, and is configured to cause the actuator 150 to raise or lower the soil removal device 144. In some constructions, the actuator 150 is a hydraulic or pneumatic arm (e.g., telescoping arm) or other linkage mechanism that mechanically raises and lowers the soil removal device 144. In other constructions, the actuator 150 includes an electrical component (e.g., solenoid or motor) that acts to raise and lower the soil removal device 144.

With reference to FIG. 2, when the soil removal device 144 is in a raised position (e.g., after the controller 154 has sent a "raise" signal to the actuator 150), the soil removal device 144 is disposed above and out of contact with a plurality of layers 158, 162, 166 of soil. With reference to FIG. 3, when the soil removal device 144 is in a lowered position (e.g., after the controller 50 has sent a "lower" signal to the actuator 150), the soil removal device 144 is in direct contact with at least one of the layers 158, 162, 166 of soil. In some constructions, the soil removal device 144 is movable (e.g., vertically) between more than two discrete positions (e.g., three, four, five, or more positions). In some constructions the soil removal device 44 is movable to an infinite number of positions.

With continued reference to FIGS. 2 and 3, the seeding adjustment system 142 further includes at least one moisture sensor 170. The moisture sensor 170 may be any of a number of types of moisture sensors, including a capacitive sensor in contact with the soil 20, an infrared sensor, or a radar sensor. In the illustrated construction, the moisture sensor 170 is coupled directly to the seed firmer device 141. In other constructions, the moisture sensor 170 is coupled to another area of the seeding machine 10 other than the seed firmer device 141 (e.g., to another area of the row unit frame 130, to the main frame 14, or to the towing tractor). In some constructions, each of the row unit frames 130 includes a moisture sensor 170.

The moisture sensor 170 is in communication with the controller 154. The moisture sensor 170 determines a moisture level of at least one of the layers 158, 162, 166 of the soil 20, and sends a signal or signals corresponding to the moisture level or levels to the controller 154. In some constructions, the moisture sensor 170 specifically determines the moisture levels of approaching soil 20 outside of the furrow 136 and ahead of the furrow opener 134 (e.g., to the right of the furrow opener 134 in FIGS. 2 and 3; see the direction of travel arrow 172 of the seeding machine 10 in FIGS. 2 and 3). In the illustrated construction, the moisture sensor 170 detects the moisture levels of soil directly in or underneath the furrow 136. In some constructions, the moisture sensor or sensors 170 detect the moisture levels of both the soil outside of the furrow 136 (e.g., the approaching soil, and/or soil laterally spaced away from the furrow opener 134) as well as the moisture levels of the soil in or underneath the furrow 136. In some constructions, the moisture sensor 170 is located closer to a front of the row unit 118, so that the moisture sensor 170 is better able to monitor the moisture conditions of approaching soil). In some constructions, the moisture sensor may be mounted to the machine frame 14 between rows, either before or laterally adjacent the row units.

With continued reference to FIGS. 2 and 3, it is desirable for seeds to be planted a specific, predetermined seed planting depth 174, as measured from a top, exposed surface 178 of the soil 20, so that emergence is equal for all such seeds. However, growth of the seeds also depends on soil moisture level at the seed planting depth 174. Therefore, if all seeds are planted at the seed planting depth 174, but some seeds are exposed to better moisture conditions than others at this depth, the resulting germination of the seeds will be uneven.

To avoid this result, the moisture sensor 170 is configured as above depending on the planting application to detect soil moisture levels in the soil at one or more of the soil layers 158, 162, 166, and sends signals regarding the moisture levels to the controller 154. If the moisture sensor 170 detects a desired moisture level at the seed planting depth 174, the controller 154 maintains the soil removal device 144 at the raised position (FIG. 2). However, if the moisture sensor 170 detects that the moisture level at the seed planting depth 174 is not optimal (e.g., too dry (below a predetermined threshold), too wet (above a predetermined threshold), and/or outside of a predetermined range), the controller 154 then activates the actuator 150 to move the soil removal device 144 into a lowered position (e.g., FIG. 3) and to remove one or more layers 158, 162, 166 of soil ahead of the furrow 136, until the moisture levels are optimal at the seed planting depth 174.

For example, in the illustrated construction of FIGS. 2 and 3, the moisture sensor 170 detects a certain moisture level at the seed planting depth 174 (located in the first soil layer 158 in FIG. 2) as well as the moisture level in the lower, second soil layer 162. The sensor 170 sends signals corresponding to the moisture levels of these layers to the controller 154. If the controller 154 determines that the moisture level at the current seed planting depth 174 is not optimal but the moisture level in the soil layer 162 is optimal, the controller 154 then determines how much top soil needs to be removed ahead of the furrow 136, such that the adjusted seed planting depth 174 (again, as measured from the top, exposed surface 178 of the soil 20) will be at the desired level of moisture. The controller 154 may, for example, determine that the entire first layer 158 of soil needs to be removed. The controller 154 sends a signal to the actuator 150, which moves the soil removal device 144 down to a lowered position (FIG. 3), where the soil removal device 144 is in position to remove the first layer 158 of soil. As illustrated in FIG. 3, after the first layer 158 has been removed, the seed planting depth 174 now extends to the lower, second soil layer 162, thereby ensuring that when the seeds are planted at the seed planting depth 174, the seeds will encounter desired levels of moisture.

In the illustrated construction, the moisture sensor 170, the controller 154, the actuator 150, and the soil removal device 144 form a closed loop, such that the moisture sensor 170 continuously monitors moisture levels in the soil 20, and the controller 154 continuously adjusts a position of the soil removal device 144 (via the actuator 150) as needed to maintain the seed planting depth 174 in an area of desired moisture levels. This ensures an automatic, consistent seeding to both the desired seed planting depth 174 and also to a desired moisture level. For example, after a period of time has passed, the controller 154 determines that the moisture levels of the first soil layer 158 have become optimal again based on signals from the moisture sensor 170, then the controller 154 automatically raises the soil removal device 144 to the raised position (FIG. 2) and the seed planting depth 174 again extends to the first soil layer 158. In contrast, if after a period of time has passed, the controller 154 determines that both the first soil layer 158 and the second soil layer 162 both have moisture levels that are not optimal based on signals from the moisture sensor 170, then the controller 150 will automatically lower the soil removal device 144 even farther (e.g., down to the third soil layer 166), based again on a calculation by the controller 154 of how much soil must be removed such that at the seed planting depth 174 the seeds will encounter desired levels of moisture.

Other constructions include an open loop system, such as where the controller 154 provides a signal or signals to a user (e.g., via a user interface in the cab 12) based on the sensed moisture levels, and the user \determines whether to manually activate the actuator 150 to cause movement of the soil removal device 144.

In some constructions, the seeding machine 10 includes a plurality of row units 118. Each of the row units 118 can include its own associated actuator 150. The actuators 150 are coupled to a single controller 154, such that the single controller 154 controls each of the associated actuators 150 individually.

In some constructions, the moisture sensor 170 is one of a plurality of moisture sensors 170 that are each coupled to a single controller 154. Each moisture sensor 170 is associated with a different row unit 118.

In some constructions, each of the row units 118 includes its own associated controller 154, its own associated moisture sensor 170, and its own associated actuator 150, such that each controller 154 only communicates with the moisture sensor 170 and the actuator 150 associated with a single row unit 118.

In some constructions, only a single moisture sensor 170 is used for the entire seeding machine 10, and the movement of the soil removal devices 144 are identical for each row unit 118, based on the moisture level detected by the single moisture sensor. In other constructions, there may be one moisture sensor per section of the machine (e.g. three or four sensors) where the signal from each moisture sensor is used to control the actuators on all row units of the associated section.

Various features and advantages of the disclosure are set forth in the following claims.

What is claimed is:

1. A seeding machine comprising:
   a main frame;
   a row unit coupled to the main frame, the row unit having a row unit frame, a gauge wheel coupled to the row unit frame, a furrow opener coupled to the row unit frame, and a furrow closer coupled to the row unit frame; and
   a seeding adjustment system including a soil removal device, the soil removal device having a stationary or rotating surface that contacts and removes one or more layers of soil ahead of the furrow opener, a moisture sensor configured to detect a moisture level at the one or more layers of soil ahead of the furrow opener, an actuator coupled to the soil removal device to move the soil removal device, and a controller configured to receive a signal from the moisture sensor corresponding to the detected moisture level and to cause the actuator to change a position of the soil removal device based on the signal received by the controller, such that as the seeding machine moves forward, seeds are planted at both a consistent seed planting depth and at a consistent moisture level.

2. The seeding machine of claim 1, wherein the moisture sensor is coupled to the row unit.

3. The seeding machine of claim 2, further comprising a seed firmer device coupled to the row unit frame, wherein the moisture sensor is coupled to the seed firmer device.

4. The seeding machine of claim 1, wherein the soil removal device is selected from a group consisting of a V-wing, a row cleaner, and a disk blade.

5. The seeding machine of claim 1, wherein the actuator is disposed between the row unit frame and the soil removal device.

6. The seeding machine of claim 5, wherein the actuator includes a linkage coupled to both the row unit frame and to the soil removal device.

7. The seeding machine of claim 1, wherein the actuator includes a hydraulic arm.

8. The seeding machine of claim 1, wherein the actuator includes a pneumatic arm.

9. The seeding machine of claim 1, wherein the row unit includes a seed metering device configured to meter seeds into a furrow, and wherein the consistent seed planting depth is measured from a top surface of the soil as the seeding machine moves forward, regardless of a position of the soil removal device.

10. The seeding machine of claim 1, wherein the one or more layers of soil includes a first layer of soil, wherein when the controller determines that a moisture level of the first layer of soil is not optimal, the controller is configured to activate the actuator such that the soil removal device is lowered to remove the first layer of soil.

11. The seeding machine of claim 1, wherein the moisture sensor, the controller, and the actuator form a closed loop control, such that the moisture sensor continuously monitors moisture levels in the one or more layers of soil and send signals to the controller, and the actuator continuously adjusts a position of the soil removal device based on signals received from the controller, to maintain both the consistent seed planting depth and the consistent moisture level.

12. The seeding machine of claim 1, wherein the row unit is one of a plurality of row units coupled to the main frame, wherein each row unit includes an associated actuator, and wherein the actuators are coupled to a single controller, such that the single controller controls each of the associated actuators individually.

13. The seeding machine of claim 12, wherein the moisture sensor is one of a plurality of moisture sensors that are each coupled to the single controller, and wherein each moisture sensor is associated with a different row unit.

14. The seeding machine of claim 1, wherein the row unit is one of a plurality of row units coupled to the main frame, and wherein each of the row units includes its own associated controller, its own associated moisture sensor, and its own associated actuator, such that each controller only communicates with the moisture sensor and the actuator associated with a single row unit.

15. The seeding machine of claim 1, wherein the row unit is one of a plurality of row units coupled to the main frame, wherein each row unit includes an associated actuator and soil removal device, wherein the moisture sensor is a single moisture sensor, and wherein the position of each soil removal device is identical based on the moisture level detected by the single moisture sensor.

16. A seeding machine comprising:
    a controller having a processor configured to:
        detect a moisture level of a first layer of soil with a moisture sensor coupled to a row unit on the seeding machine;
        determine whether the moisture level is outside of a predetermined range; and
        in response to determining that the moisture level is outside of the predetermined range, lower a soil removal device into the soil to remove the first layer of the soil such that as the seeding machine moves forward, seeds are planted at both a consistent seed planting depth and at a consistent moisture level, the soil removal device including a stationary or rotating surface that contacts and removes the first layer of soil.

17. The seeding machine of claim 16, wherein the processor is configured to, after lowering the soil removal device, detect that the moisture level has become optimal in the first layer of soil and then raise the soil removal device.

18. The seeding machine of claim 16, wherein the processor is configured to, after lowering the soil removal device, detect that the moisture level is not optimal and then lower the soil removal device a second time.

19. A seeding machine comprising:
    a main frame;
    a row unit coupled to the main frame, and
    a seeding adjustment system coupled to the row unit, the seeding adjustment system including:
        a soil removal device, the soil removal device selected from a group consisting of a V-wing, a row cleaner, and a disk blade, the soil removal device having a stationary or rotating surface that contacts and moves one or more layers of soil;
        a moisture sensor coupled to the row unit and configured to detect a moisture level at the one or more layers of soil;
        a controller configured to receive a signal from the moisture sensor corresponding to the detected moisture level; and
        an actuator configured to change a position of the soil removal device based on the signal received by the controller, the actuator selected from a group consisting of a hydraulic actuator, a pneumatic actuator, and an electronic actuator;
    wherein the controller is configured to cause the actuator to change the position of the soil removal device in response to the received signal such that as the seeding machine moves forward, seeds are planted at both a consistent seed planting depth and at a consistent moisture level.

* * * * *